United States Patent

Koaizawa et al.

[11] Patent Number: 5,449,408
[45] Date of Patent: Sep. 12, 1995

[54] OPTICAL FIBER COATING APPARATUS AND POSITIONING METHOD THEREOF

[75] Inventors: Hisashi Koaizawa, Ichihara; Yukio Komura, Chiba; Nobuaki Orita, Kameyama, all of Japan

[73] Assignee: Furukawa Electric Co., Ltd., Tokyo, Japan

[21] Appl. No.: 90,168
[22] PCT Filed: Nov. 25, 1992
[86] PCT No.: PCT/JP92/01541
  § 371 Date: Jul. 22, 1993
  § 102(e) Date: Aug. 2, 1993
[87] PCT Pub. No.: WO93/11081
  PCT Pub. Date: Jun. 10, 1993

[30] Foreign Application Priority Data
  Nov. 25, 1991 [JP] Japan .................. 3-96404 U

[51] Int. Cl.⁶ .................................. B05C 3/15
[52] U.S. Cl. ...................... 118/405; 118/420; 118/DIG. 18
[58] Field of Search ....... 118/234, 405, 420, DIG. 18, 118/DIG. 19; 65/3.1; 425/113, 133.1, 462, 192 R; 264/1.28, 1.29

[56] References Cited

U.S. PATENT DOCUMENTS

| | | | |
|---|---|---|---|
| 2,386,818 | 10/1945 | Seavey | 118/405 X |
| 2,787,980 | 4/1957 | McDermott | 118/405 |
| 3,060,889 | 10/1962 | Knapp | 118/DIG. 18 X |
| 3,110,625 | 11/1963 | Bettner | 118/DIG. 18 |
| 3,568,640 | 3/1971 | Kuettner | 118/405 |
| 4,093,414 | 6/1978 | Swiatovy | 425/113 |
| 4,208,200 | 6/1980 | Claypoole et al. | 118/234 X |
| 4,264,649 | 4/1981 | Claypoole et al. | 427/163 |
| 4,354,989 | 10/1982 | Beach | 264/40.6 |
| 4,426,954 | 1/1984 | Keller | 118/125 |
| 4,505,222 | 3/1985 | Holt et al. | 118/304 |
| 4,510,884 | 4/1985 | Rosebrooks | 118/405 |
| 4,539,226 | 9/1985 | Paek et al. | 427/163 |
| 4,688,515 | 8/1987 | Rosebrooks | 118/405 |
| 4,778,367 | 10/1988 | Hilakos | 425/113 |
| 4,838,777 | 6/1989 | Weber | 425/114 |
| 4,998,870 | 3/1991 | Seibert | 425/113 |
| 5,152,817 | 10/1992 | Bennett et al. | 65/3.1 |
| 5,160,540 | 11/1992 | Fickling et al. | 118/405 |
| 5,160,541 | 11/1992 | Fickling et al. | 118/405 |

FOREIGN PATENT DOCUMENTS

| | | |
|---|---|---|
| 57-118052 | 7/1982 | Japan . |
| 62-182136 | 8/1987 | Japan . |
| 2-26852 | 1/1990 | Japan . |

OTHER PUBLICATIONS

International Search Report for International Appln. No. PCT/JP92/01541.

*Primary Examiner*—James C. Housel
*Assistant Examiner*—Harold Y. Pyon
*Attorney, Agent, or Firm*—Staas & Halsey

[57] ABSTRACT

An optical fiber coating apparatus which has a left holder unit 13a and a right holder unit 13b, in the left holding space 12a and right holding space 12b defined in those units are housed a second layer die 16a, 16b, a first layer die 17a, 17b, and a nipple 18a, 18b in a superposed state. The second layer die 16a, 16b and the first layer die 17a, 17b and the nipple 18a, 18b have block shaped planar outer contour shapes and the holding space 12a, 12b housing these also has a block shaped planar outer contour shape. Since the outer shapes of the dies 16a, 16b and 17a, 17b and the nipple 18a, 18b and the holding space 12a, 12b are all block shaped, it is easy to perform the axial alignment of the holes 30, 31, and 32 through which the optical fiber passes by pressing the die 16a, 16b, the die 17a, 17b, and the nipple 18a, 18b against the reference surfaces 19, 21 of the left holding space 12a.

14 Claims, 4 Drawing Sheets

OPTICAL FIBER COATING APPARATUS AND POSITIONING METHOD THEREOF

TECHNICAL FIELD

The present invention relates to an optical fiber coating apparatus for forming a resin coating on the outer surface of an optical fiber and to a method of positioning of the optical fiber coating apparatus.

BACKGROUND ART

FIG. 1 shows the general construction of an optical fiber producing apparatus. FIG. 2 is a sectional view of a coated optical fiber 200C produced by the optical fiber producing apparatus.

An optical fiber preform 102 is heated in a drawing furnace 101 to produce an optical fiber 200 comprised of a core 201 of a diameter of about 10 μm, in a case of a single mode optical fiber, and a cladding 202 of a diameter of 125 μm formed on the core 201. The outer diameter of the optical fiber 200 is measured by an outer diameter measuring unit 104. Preferably, to protect the optical fiber 200 and improve its water resistance, it is treated with acetylene gas ($C_2H_2$), chlorine gas ($Cl_2$), etc. in a hot CVD reaction furnace to deposit a carbon hermetic coating 203 on the cladding 202 of the optical fiber 200 by CVD. Further, a primary resin coating 204 is given on the carbon hermetic coating 203 in a primary resin coating apparatus 106 comprised of a resin tank 107 and an ultraviolet curing apparatus 108. A secondary resin coating 205 is then given in a secondary resin coating apparatus 110 comprised of a resin coater 111 and an ultraviolet curing apparatus 112. Usually, the Young's modulus of the primary resin coating 204 is lower than the Young's modulus of the secondary resin coating 205, and the primary resin coating 205 functions as a buffer layer.

After this, the coated optical fiber 200C comprised of the optical fiber 200A given by the resin coatings 204 and 205 is taken up on a takeup machine 115 through a takeup capstan 114.

The carbon hermetic coating 203 is provided for the purpose of protecting the cladding 202 and improving the mechanical strength and the water resistance, but when there is no such need for this, a coated optical fiber 200C without the carbon hermetic coating 203 in FIG. 2 is used.

The coated optical fiber 200C produced by the method shown in FIG. 2 is formed of a core 201 of about 10 μm at its center, a cladding of a diameter of 125 μm at its periphery, a carbon hermetic coating 203 of a thickness of about 50Å at the periphery of the cladding, and further, for example, a primary resin coating 204 of a thickness of about 10 μm and, for example, a secondary resin coating 205 of a thickness of about 35 μm, thereby giving a coated optical fiber 200C having an outer diameter of about 215 μm overall. This example shows the cross-sectional construction of a coated optical fiber 200C with a carbon hermetic coating 203. Usually, the outer diameter of the coated optical fiber is about 450 μm, but the thicknesses of the core 201 and the cladding 202 do not change, so in this case the thicknesses of the primary resin coating 204 and the secondary resin coating 205 are made greater.

If a solid object touches the surface of the optical fiber 200 right after it is drawn from the optical fiber preform 102, the surface will be damaged. When dust is deposited on it, the mechanical strength of the optical fiber 200 will deteriorate. Therefore, as mentioned above, in the past, the surface of the optical fiber 200 just after drawing or the surface of the optical fiber 200A with the carbon hermetic coating 203 is coated with resin coating layers 204 and 205 comprised of a thermal curable resin, an ultraviolet curable resin, etc.

To improve the production efficiency of the coated optical fiber, it was attempted to raise the drawing speed from, for example, 500 m/minute or so to 1000 m/minute or so. The increase of the drawing speed reduces the manufacturing time and causes a reduction in the manufacturing cost of the coated optical fiber, but the high temperature optical fiber 200 exiting from the drawing furnace 101 or the high temperature optical fiber 200A just after the formation of the carbon hermetic coating 203 in the hot CVD furnace 105 is then supposed to be introduced into the resin coating apparatuses 106 and 110. Therefore, it is necessary to lower the temperature of the optical fiber 200A before introduced into the resin coating apparatus 106.

As the method for this, there are the methods of (1) providing a forced cooling apparatus after the outer diameter measuring unit 104 when not forming a carbon hermetic coating 203 and after the hot CVD furnace when forming the carbon hermetic coating 203 so as to force cool the optical fiber or (2) increasing the distance between the outer diameter measuring unit 104 or the hot CVD furnace 105 and the resin coating apparatus 106 to allow natural cooling of the optical fiber. The provision of the forced cooling apparatus means that the distance between the outer diameter measuring unit 104 or the hot CVD furnace 105 and the resin coating apparatus 106 is increased and the height of the building the optical fiber producing apparatus is raised. Similarly, even in the case of natural cooling, the height of the building for the optical fiber producing apparatus is raised.

The raising of the height of the building the optical fiber producing apparatus is not recommended for economic reasons etc.

As a means of improvement, recently, for example, as disclosed in U.S. Pat. No. 4,510,884, proposal has been made of the method of successively coating the surface of the optical fiber with not only a single resin coating layer, but a multiple resin coating layers. That is, there is known the method of combining the two resin coating apparatuses 106 and 110 shown in FIG. 1 into a single unit and simultaneously coating the resin coatings 204 and 205.

A cross-sectional view of the optical fiber coating apparatus disclosed in U.S. Pat. No. 4,510,884 is shown in FIG. 3A, while a top plane view is shown in FIG. 3B.

In this optical fiber coating apparatus, dies 53 and 63 and a nipple 54, each having a circular outer shape, are housed superposed on each other interspaced with two resin chambers 55 and 65 in a circular-section holding space 52 of a holder 51. Resin supply paths 56 and 66 are connected with the resin chambers 55 and 65. Two resin coating layers are provided about the center of the axis of passage of the optical fiber 57 comprised of a core and cladding (and if necessary further a carbon hermetic coating) running through the holes 53a, 63a, and 54a of the centers of the dies 53 and 63 and the nipple 54. These dies 53 and 63 and nipple 54 are affixed by soldering to the holder 51.

In this optical fiber coating apparatus, if the center axes of the holes 53a, 63a, and 54a of the second layer die 53, the first layer die 63, and the nipple 54 do not match, then the thickness of at least one resin coating layer deposited on the optical fiber or the carbon hermetic coating will not be uniform which will in coated fiber cause the deterioration of the temperature characteristic of the optical fiber.

The reason for this will be explained taking as an example the low temperature attenuation characteristic. When an optical fiber 57 coated with a resin is exposed to low temperatures, the resin covered on the outer surface of the optical fiber 57 will contract. If at that time the resin coating layer is nonconcentric in thickness, the amount of contraction in the outer surface direction will not be uniform. As a result, buckling arising due to the uneven contraction force will occur in the optical fiber 57 and will lead to an increase in the signal transmission loss in the optical fiber 57 due to microbent.

In this way, minute deviations in the center axes of the holes 53a, 63a, and 54a of the dies 53 and 63 and the nipple 54 (hereinafter referred to simply as the "deviations") present extremely significant problems in this type of optical fiber coating apparatus. The reason is that the optical fiber cable, as mentioned above, has the cross-sectional dimensions of a core diameter of about 10 μm, an outer diameter of the cladding of 125 μm, and a primary layer of a thickness of about 10 μm, which requires the sizes of the holes of the dies and the nipple to be small, and it is necessary to align the axial centers very precisely.

Considering the optical fiber coating apparatus disclosed in U.S. Pat. No. 4,510,884 from this viewpoint, since the inside shape of the holding space 52 of the holder 51 and the outer shapes of the dies 53 and 63 and the nipple 54 are all circular, for example, when the hole 54a to be provided at the center of the outer shape of the nipple 54 itself is slightly deviated, correction is required to make the hole 54a be positioned at the center while maintaining the circular outer shape of the nipple 54. In actuality, however, this correction of position is not easy under the dimensional conditions of the optical fiber mentioned above. Therefore, there was the problem that sometimes a new nipple 54 with a corrected position of the hole 54a had to be made. The dies 53 and 63 suffer from the same type of problems as above.

DISCLOSURE OF INVENTION

The object of the present invention is to provide an optical fiber coating apparatus which enables accurate work for correcting the alignment of the center axes of the dies and nipple for application of the resin coverings and enables quick and easy positioning.

Another object of the present invention is to provide a method for positioning in such an optical fiber coating apparatus.

The constitution of an optical fiber coating apparatus of the present invention for achieving the above-mentioned object will be explained below.

The optical fiber coating apparatus of the present invention includes dies and a nipple which are laid superposed on each other and provide resin coating layers on an optical fiber passing through their holes formed with block-shaped (square) planar outer contour shapes (outer shapes) and has the holding space for holding the dies and nipple formed into a block-shape (square) planar outer contour shape matching the dies and nipple.

If the dies and nipple are formed into squares in outer shape and the holding space is also formed into a square matching the outer shapes of the dies and nipple in this way, even if there is deviation in the center positions of the holes for the resin coating through which the optical fiber passes, the surface for correction of the deviation is a plane forming one surface of the square in all cases, so when the center position of a hole deviates to the plus side, the corrective grinding of that surface is easy and when it deviates to the minus side, the insertion of a spacer is easy. As a result, the corrective work to align the axes of the dies and nipple can be performed accurately, quickly, and easily.

BEST MODE FOR CARRYING OUT THE INVENTION

Figure 1:
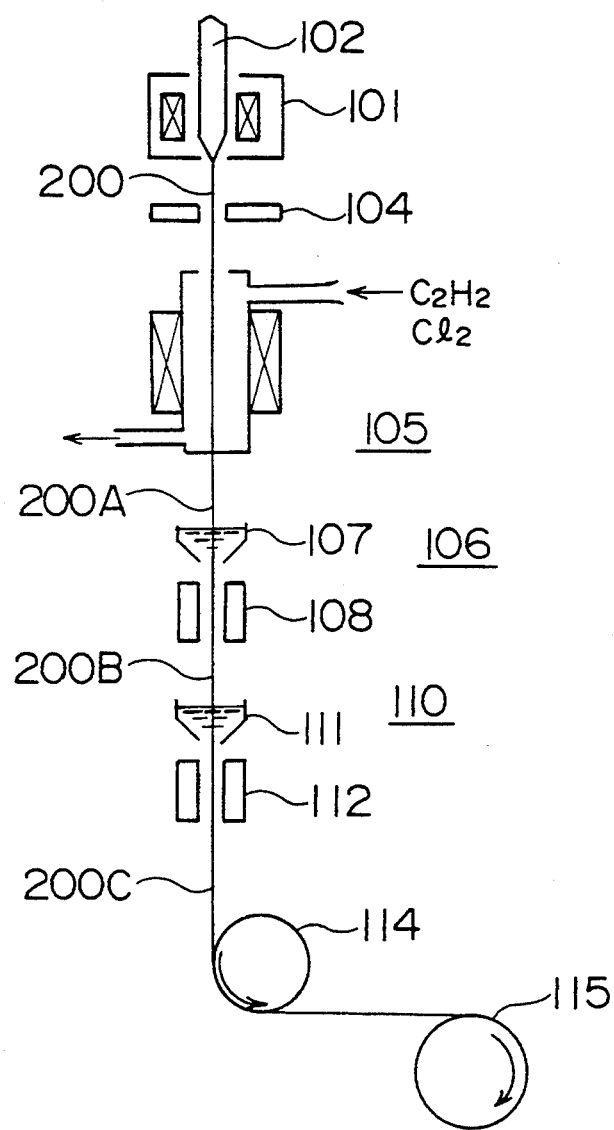
FIG. 1 is a constitutional view of a conventional optical fiber producing apparatus.
Figure 4A:
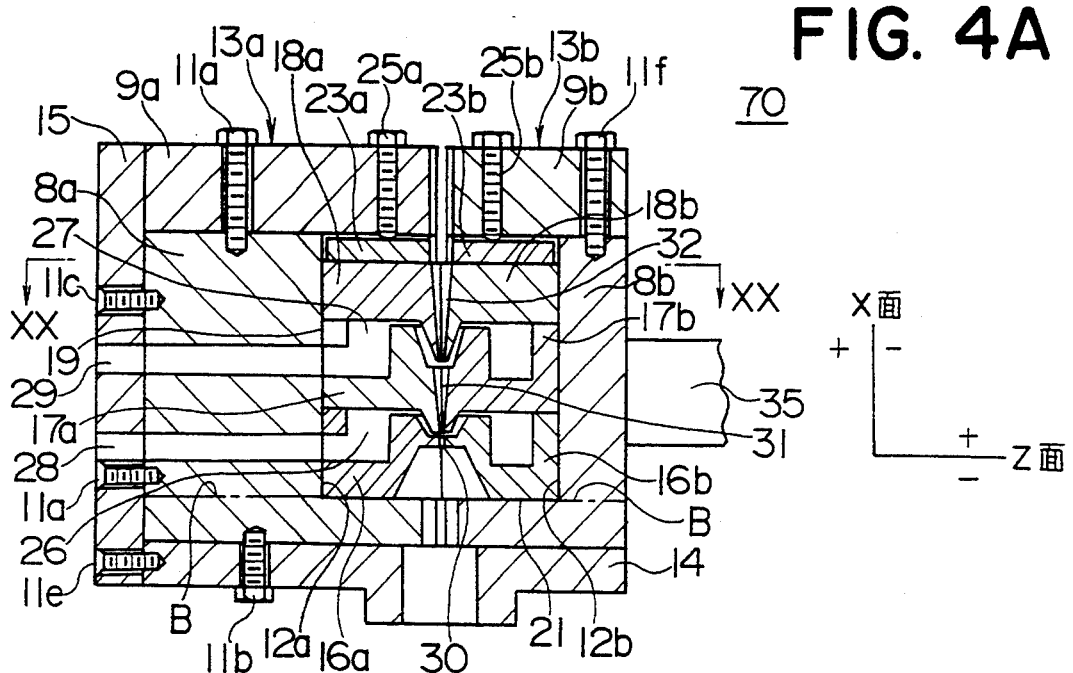
FIG. 4A is a longitudinal sectional view of an optical fiber coating apparatus of an embodiment of the present invention and FIG. 4B is a sectional view along the line XX—XX in FIG. 4A.
Figure 4B:
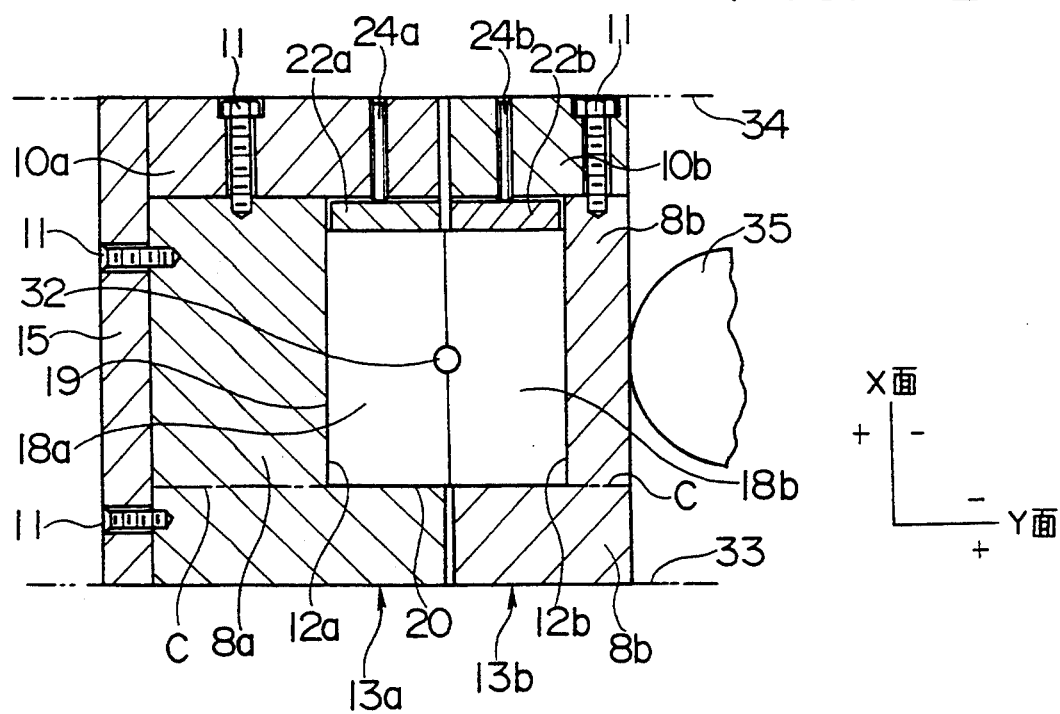
Figure 5:
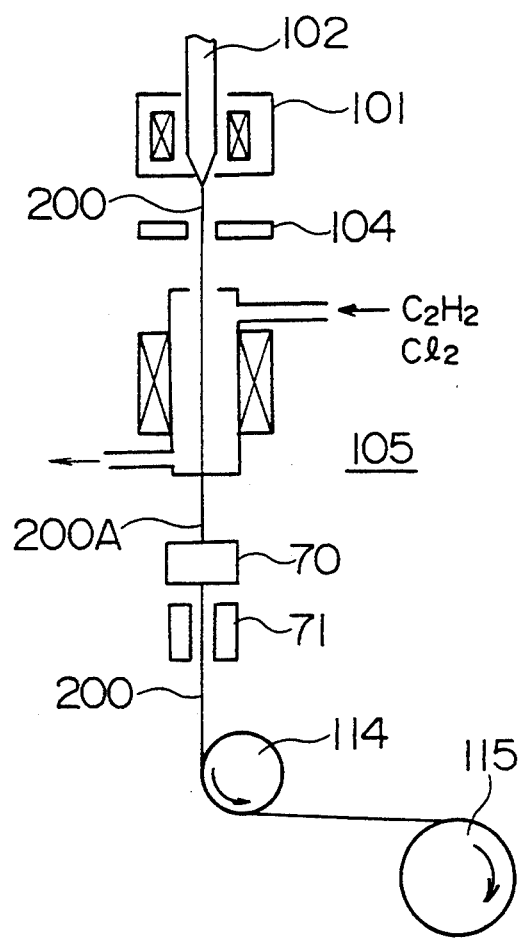
FIG. 5 is a constitutional view of an optical fiber drawings apparatus comprising the optical fiber coating apparatus shown in FIG. 4 installed in the optical fiber drawings apparatus.

The optical fiber coating apparatus 70 shown in FIG. 4A and FIG. 4B is provided, for example, in place of the resin coating apparatuses 106 and 110 in the optical fiber drawing apparatus shown in FIG. 1. As illustrated in FIG. 5, it is provided under a hot CVD furnace 105 and under that is provided an ultraviolet curing apparatus 71.

Figure 2:
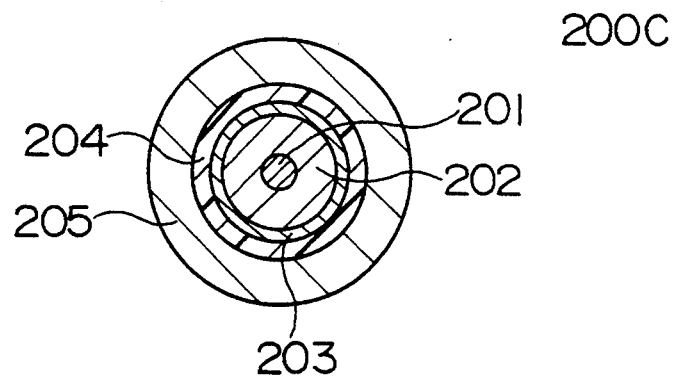
FIG. 2 is a sectional view of a coated optical fiber.
Figure 3A:
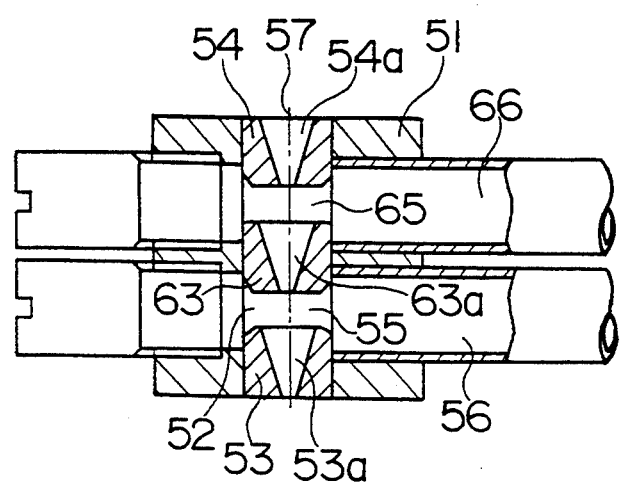
FIG. 3A is a longitudinal sectional view of key portions of a conventional optical fiber coating apparatus and FIG. 3B is a partial plane view of a conventional optical fiber coating apparatus.
Figure 3B:
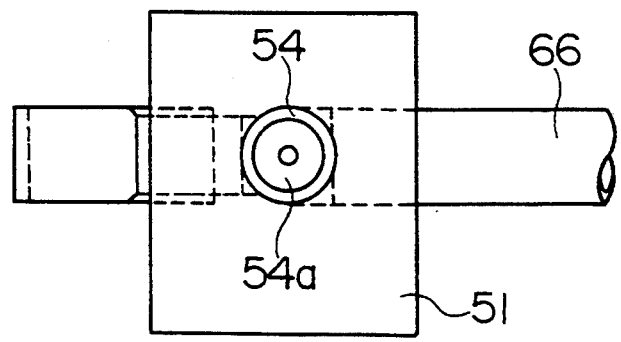

The optical fiber drawing apparatus shown in FIG. 5 also enables the fabrication of the same covered optical fiber 200C illustrated in FIG. 2. However, by just replacing the two resin coating apparatuses 106 and 110 with the optical fiber coating apparatus 70 and ultraviolet curing apparatus 71, the height of the optical fiber drawing apparatus is lowered.

Note that in this embodiment too, the example of an optical fiber coating apparatus 70 providing two resin coating layers is shown.

The construction of this optical fiber coating apparatus 70 will now be explained in accordance with the order of assembly.

First, a left holder top fixing plate 9a is affixed to the top of a left holder 8a, and a left holder side plate 10a is affixed to the side surface of the left holder 8a using a bolt or other connecting piece 11a in both cases. This forms a left holder unit 13a having a left holding space 12a with a block (square) shaped planar outer contour in which are housed the left halves of the later mentioned dies and nipple. Therefore, the left holder unit 13a consists of an integral construction of the left holder 8a and the left holder side plate 10a.

Next, the left holder unit 13a is affixed to the top of a die base 14 by a connecting piece 11b, and the die base holder connection plate 15 is affixed to the back surface of the left holder unit 13a by connecting pieces 11c to 11e so as to firmly connect the left holder unit 13a and the die base 14.

By this, the left holding space 12a is formed by the left holder unit 13a, the die base holder connection plate 15, and the die base 14. The left holding space 12a forms a block shape with one open end.

In the same way, the right holder top fixing plate 9b is affixed to the top of the right holder 8b and the right holder side plate 10b is affixed to the side surface using a bolt or other connecting piece 11f in both cases to form a right holder unit 13b having a right holding space 12b with a block (square) shaped planar outer contour in which are housed the right halves of the later mentioned dies and nipple. Therefore, the right holder unit 13b consists of an integral construction of the right holder 8b and the right holder side plate 10b. Further, the right holding space 12b having a block shape with one open end is defined by the construction of the right holder unit 13b.

Here, when fabricating the left holder unit 13a and the right holder unit 13b, members split at the positions shown by the one-dot-chain line shown by B and C in FIGS. 4A and 4B are prepared in advance and then later these members are connected by bolts or other connection pieces 11a to 11f to form the left holder unit 13a and the right holder unit 13b.

Note that the left holder unit 13a and the right holder unit 13b may also be prepared as a single body. Even when fabricating them separately however, the fabrication work is easy.

Next, in the block shaped left holding space 12a of the left holder unit 13a are housed, in order from bottom to top, the left second layer die 16a, the left first layer die 17a, and the left nipple 18a successively and in a superposed fashion and while pushing these to the X-direction reference surface 19, the Y-direction reference surface 20, and the Z-direction reference surface 21. Further, a left side spacer 22a of a suitable size is inserted into the clearance between the left holder side plate 10a and the left second layer die 16a, the left first layer die 17a, and the left nipple 18a facing the same. In addition, a left top spacer 23a of a suitable size is inserted into the clearance between the left holder top fixing plate 9a and the left nipple 18a. The spacers 22a and 23a are provisionally affixed by the left side spacer cap screw 24a and the left top spacer cap screw 25a.

In the same way, in the block shaped right holding space 12b of the right holder unit 13b are housed, in order from bottom to top, the right second layer die 16b, the right first layer die 17b, and the right nipple 18b successively and in a superposed fashion and while pushing these to the X-direction reference surface 19, the Y-direction reference surface 20, and the Z-direction reference surface 21. Further, a right side spacer 22b of a suitable size is inserted into the clearance between the right holder side plate 10b and the right second layer die 16b, the right first layer die 17b, and the right nipple 18b facing the same. In addition, a right top spacer 23b of a suitable size is inserted into the clearance between the right holder top fixing plate 9b and the right nipple 18b. The spacers 22b and 23b are provisionally affixed by the right side spacer cap screw 24b and the right top spacer cap screw 25b.

In this case, the left holder unit 13a and the die base holder connection plate 15 have formed in them in advance the resin supply paths 28 and 29 extending to the resin chambers 26 and 27 of the second layer die 16a, 16b forming the secondary resin coating 205 and the first layer die 17a, 17b forming the first resin coating. Note that usually the Young's modulus of the primary resin 204 is lower than the Young's modulus of the secondary resin 205, so resins with different Young's modulii are supplied to the resin supply paths 28 and 29.

In this way, the second layer die 16a, 16b, the first layer die 17a, 17b, and the nipple 18a, 18b are split in two at the plane including the center axes of the center die holes 30 and 31 and the nipple hole 32.

After the right second layer die 16b, the right first layer die 17b, and the right nipple 18b are housed in the right holding space 12b of the right holder unit 13b in this way, the right holder unit 13b is placed on the top of the die base 14 and brought into facial contact with the left holder unit 13a already affixed on the die base 14.

At this time, as shown by the two-dot chain line of FIG. 4B, the positioning walls 33 and 34 are placed at the two side surfaces. The two side surfaces of the right holder unit 13b are made to slide in contact with the inside surfaces of the walls 33 and 34 to fit the unit in. It is sufficient to position the unit so that the centers of the die holes 30 and 31 of the second layer die 16a, 16b and the first layer die 17a, 17b and the nipple hole 32 of the nipple 18a, 18b match.

After the two holder units 13a and 13b are placed into facial contact in this way, the two holder units 13a and 13b are provisionally affixed so that they will not move by, for example, a side fastener 35 which has a circular contact surface and rotates about a pivot.

Note that the "deviation" of the die holes 30 and 31 and the nipple hole 32 of the second layer die 16a, 16b and the first layer die 17a, 17b and nipple 18a, 18b, that is, the "slanting" of the center axes of the holes 30 to 32 in the Z-axial direction, is measured by an optical microscope etc. before the assembly and the apparatus is fabricated so that there is almost no slanting of the center axes or it is within a tolerable range.

For the method of measurement of the deviation of the center positions of the holes after the assembly, for example, the position of the die hole 30 of the second layer die 16a, 16b is used as a reference. In the aforementioned superposed state, using an inspection apparatus like an optical microscope, the deviation between the center position of the die hole 30 constituted by the second layer die 16a, 16b and the center position of the die hole 31 constituted by the first layer die 17a, 17b is measured in the X- and Y-axial and Z-axial directions (the Z-axial direction is for viewing the slanting of the center axes. For the Z-axial direction, however, measurement is actually unnecessary, since the individual members are fabricated in advance so that there is no slanting).

As a result of the measurement, if the first layer die hole 31 deviates to the plus (+) side in the X-axial direction, after completion of the measurement of the deviation between the center position of the nipple hole 32 in the nipple 18a, 18b and the center position of the die hole 30 in the second layer die 16a, 16b, the left side spacer cap screw 24a, the right side spacer cap screw 24b, the left top space cap screw 25a, and the right top spacer cap screw 25b are removed, the left side spacer 22a, the right side spacer 22b, the left top spacer 23a, and the right top spacer 23b are removed, the provisional affixing in the different directions is released, and the surface of the left first layer die 17a contacting the X-direction reference surface 19 is ground by the amount of the deviation. Conversely, if deviating to the minus (−) side, a spacer (not shown) of the thickness corresponding to the deviation is prepared and inserted between the contact surfaces of the X-direction reference surface 19 of the left holder unit 13a and the left first layer use die 17a for positioning.

The same type of centering of the hole is performed for the Y-axial direction as well.

After the axial alignment of the first layer die 17a, 17b is completed, the deviation of the center position of the nipple hole 32 constituted by the nipple 18a, 18b is corrected by alignment of the center axis with the die hole 30 in the second layer die 16a, 16b serving as the reference surface by the same type of procedure as mentioned above.

Note that by the above adjustment for axial alignment, the result is that the axial alignment of the second layer die 16a, 16b and the first layer die 17a, 17b is completed, so the axial alignment of the left and right nipples 18a and 18b may be performed using as a reference the die hole 31 of the first layer die 17a, 17b positioned directly underneath.

After the series of positionings above is completed, as shown in FIGS. 4A and 4B, the right side spacer cap screw 24b is firmly fastened into the threaded hole of the right holder side plate 10b and the right top spacer cap screw 25b is firmly fastened into the right holder unit 13b to firmly affix the entire apparatus.

If this state is achieved, then the left and right holder units (left holder unit 13a and right holder unit 13b containing dies and nipple) may be handled separately. For example, when passing an optical fiber through the dies and the nipple, the fiber may be passed through with the right holder unit 13b detached from the die base 14. Suitably thereafter, for example, it is sufficient to provide a positioning key (not shown) etc. in advance on the die base 14, bring the right holder unit 13b into facial contact with the left holder unit 13a along the key, and bring the two holder units 13a and 13b into firm contact by the side fastener 35.

The optical fiber coating apparatus assembled in this way, for example, is installed in a line of an optical fiber drawing apparatus shown in FIG. 5 and supplies an ultraviolet curable resin etc. from the resin supply paths 28 and 29 for example to form the resin coating layers 204 and 205 simultaneously on the outer surface of the optical fiber 200A. These resin coating layers coverings 204 and 205 are cured by an ultraviolet lamp apparatus 71.

When changing the thickness or other sizes of the resin, the side fastener 35 is loosened and right holder unit 13b is detached from the die base 14, thereby enabling separation from the left holder unit 13a. For reassembly, the procedure mentioned earlier is used.

In this way, the optical fiber coating apparatus of the present embodiment is handled as an optical fiber coating apparatus comprised of two left and right components overall. Therefore, there is the advantage that the management of parts, the work of threading the fiber, and the assembly work for the next use become extremely easy.

Note that in the embodiment of the optical fiber coating apparatus mentioned above, the explanation was made taking as an example a holder unit spilt into two left and right components, but from the viewpoint of raising the precision of positioning of the die and nipple holes, it is possible to make the left holder unit 13a, the right holder unit 13b. A single unit rather than dividing them. The procedure in this case is substantially the same as the case of the split type optical fiber coating apparatus. The point to watch is to measure the center positions of the holes after firmly pressing the square shaped dies and nipple against the X-axial, Y-axial, and Z-axial reference surfaces of the inside surfaces of the holder unit. The method of correction in the case of deviation is the same as the embodiment of the split type mentioned above.

As explained above, the optical fiber coating apparatus according to the present invention has the dies and the nipple formed to be square in outer shape and has the holding space inside the holder unit formed to be square matching the outer shapes of the dies and the nipple, so when there is deviation in the center positions of the holes of the dies and nipple, since the surfaces to be corrected are all flat surfaces, the corrective grinding when the center positions of the holes deviate in the plus direction is easy and the insertion of spacers when they deviate to the minus direction is easy as well. Therefore, according to the optical fiber coating apparatus of the present invention, the reparing work for axial alignment of the dies and nipple is easy and further the axial alignment can be performed with an extremely high precision.

Industrial Applicability

The optical fiber resin coating apparatus of the present invention may be effectively used for the production of a resin coated optical fiber. Further, it may be used for the production of optical fiber ribbons with a longitudinal sectional shape comprised of a plurality of optical fibers arranged in parallel in a flat array and covered overall. Further, it may be used for an optical fiber unit where a plurality of optical fibers are bundled into a circularly sectional shape and then coated with resin.

We claim:

1. An optical fiber coating apparatus comprising at least one die and a nipple housed in a superposed state in a holding space defined in a holder unit and wherein when the optical fiber is passed through holes of the dies and nipple, at least one resin coating means provides a resin layer on the outer surface of the optical fiber, the at least one die and the nipple are formed to have a rectangular block-shaped planar outer contour shapes and the holding space defined in the holding unit and housing the dies and the nipple is formed in a rectangular block-shape matching the planar outer contour shape and size of the dies and the nipple so as to house the dies and nipple while matching the center axes of the holes formed in the dies and the nipple.

2. An optical fiber coating apparatus as set forth in claim 1, wherein said holder unit is formed so as to perform the positioning in the horizontal direction for the dies and the nipple housed in left and right holding spaces.

3. An optical fiber coating apparatus as set forth in claim 1, wherein said holding space is provided with reference surfaces in at least two dimensional directions matching the planar outer shape and has a means for pressing and affixing the dies and the nipple against the reference surfaces.

4. An optical fiber coating apparatus as set forth in claim 3, wherein position adjusting spacers are provided at positions corresponding to the positions of provision of the dies and the nipple at the surfaces facing the reference surfaces across the dies and nipple and the thickness of the spacers is adjusted so as to adjust the center axial positions of the holes of the dies and the hole of the nipple.

5. An optical fiber coating apparatus as set forth in claim 4, wherein the holder unit housing said dies and nipple in said holding space is split into a left holder unit having a left holding space and a right holder unit having a right holding space and after the dies and the nipples are housed in the left holding space, the right holder unit is brought into facial contact with the left holder unit while fitting into the right holding space the portions of the dies and the nipple protruding from the left holding space so as to form a single holder unit.

6. An optical fiber coating apparatus as set forth in claim 5, wherein when the right holder unit is formed into one body with the left holder unit, the right holder unit is brought into facial contact along the reference surfaces of the left holder unit.

7. An optical fiber coating apparatus as set forth in claim 6, wherein said dies are split into a left die and a right die substantially centered at the optical fiber holes and said left die is housed in said left holding space, the right die is housed in said right holding space, and when the left holder unit and the right holder unit are formed into one body, these are also formed into one body.

8. An optical fiber coating apparatus as set forth in claim 6, wherein said nipple is split into a left nipple and a right nipple substantially centered at the optical fiber hole and said left nipple is housed in said left holding space, the right nipple is housed in said right holding space, and when the left holder unit and the right holder unit are formed into one body, these are also formed onto one body.

9. An optical fiber coating apparatus as set forth in claim 1, wherein said left holder unit is constituted by a left holder, a left holder side plate and a die base, which define a left holding space forming a block with one open end.

10. An optical fiber coating apparatus as set forth in claim 1, wherein said right holder unit is constituted by a right holder and a right holder side plate, which define a branched right holding space forming a block with one open end.

11. An optical fiber coating apparatus as set forth in claim 10, wherein the space for fitting the dies and the nipple is defined by the left holding space and the right holding space.

12. An optical fiber coating apparatus as set forth in claim 1, wherein the holder unit is formed so as to position cubically the dies and the nipple housed in the left and right holding spaces.

13. An optical fiber coating apparatus as set forth in claim 12, wherein reference surfaces are provided in three dimensional directions in the holding space matching the outer planar shape and there is provided a means for pressing and affixing the dies and the nipple against these reference surfaces.

14. An optical fiber coating apparatus as set forth in claim 13, wherein position adjusting spacers are provided at positions corresponding to the positions of provision of the dies and the nipple at the surfaces facing the reference surfaces across the dies and nipple and the thicknesses of the spacers are adjusted so as to adjust the center positions and height positions of the holes of the dies and the hole of the nipple.

* * * * *